(12) United States Patent
Pauli et al.

(10) Patent No.: US 8,801,323 B2
(45) Date of Patent: Aug. 12, 2014

(54) PRESSURIZED CASING

(75) Inventors: Ernst Pauli, Zürich (CH); Pavel Rihak, Baden (CH); Werner Balbach, Würenlingen (CH); Joachim Krautzig, Widen (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/494,390

(22) Filed: Jun. 12, 2012

(65) Prior Publication Data

US 2013/0078032 A1    Mar. 28, 2013

(30) Foreign Application Priority Data

Jun. 21, 2011   (CH) ........................................ 1046/11

(51) Int. Cl.
*F16D 1/033* (2006.01)

(52) U.S. Cl.
USPC ........... 403/337; 403/335; 403/336; 403/344; 285/368; 285/412; 415/214.1

(58) Field of Classification Search
USPC ......... 403/20, 28, 30, 32, 234, 235, 290, 331, 403/335–338, 344; 285/187, 367, 368, 412; 285/905; 415/213.1, 215.1, 134, 214.1
See application file for complete search history.

(56) References Cited

U.S. PATENT DOCUMENTS

| | | | | |
|---|---|---|---|---|
| 2,950,930 A * | 8/1960 | Dunmire | ...................... | 285/110 |
| 3,165,339 A * | 1/1965 | Faccon | .......................... | 285/263 |
| 3,181,901 A * | 5/1965 | Watts | ............................ | 285/367 |
| 3,633,598 A * | 1/1972 | Morris et al. | .............. | 137/15.17 |
| 5,511,941 A * | 4/1996 | Brandon | ..................... | 415/214.1 |
| 5,675,873 A * | 10/1997 | Groess | ............................ | 24/284 |
| 5,908,210 A * | 6/1999 | Fetzer | ............................. | 285/24 |
| 7,198,465 B1 | 4/2007 | Ichiryu | | |
| 7,871,239 B2 * | 1/2011 | Sorokes | ..................... | 415/214.1 |
| 2003/0180140 A1 | 9/2003 | Reigl | | |
| 2009/0185894 A1 * | 7/2009 | Kneeland et al. | ................. | 415/1 |
| 2010/0104358 A1 * | 4/2010 | Lang et al. | .................... | 403/344 |

FOREIGN PATENT DOCUMENTS

DE     19850470 A1    2/2000

OTHER PUBLICATIONS

Search Report for Swiss Patent App. No. 1046/2011 (Oct. 7, 2011).

* cited by examiner

*Primary Examiner* — Daniel P Stodola
*Assistant Examiner* — Nahid Amiri
(74) *Attorney, Agent, or Firm* — Buchanan Ingersoll & Rooney

(57) ABSTRACT

A pressure casing has a plurality of casing shells (10*a, b*) which can be connected in a pressure-tight manner in a parting plane (11) by a flange (13). The casing shells (10*a, b*) are pressed together with sealing effect in the parting plane (11) in the region of the flange (13) by at least one threaded bolt (19; 19*a-d*) which extends through the flange (13) perpendicularly to the parting plane (11). A reduced thermal loading of the threaded bolts (19; 19*a-d*) of the flanged joint is achieved by the at least one threaded bolt (19; 19*a-d*) being exposed over a part of its length towards the inner side of the casing (10).

5 Claims, 2 Drawing Sheets

PRESSURIZED CASING

This application claims priority under 35 U.S.C. §119 to Swiss App. No. 01046/11, filed 21 Jun. 2011, the entirety of which is incorporated by reference herein.

BACKGROUND

1. Field of Endeavor

The present invention relates to the field of thermal machines, and more specifically relates to a pressure casing.

2. Brief Description of the Related Art

Conventional bolted flange joints for pressure casings of thermal machines, as are reproduced in an example in FIG. 1, or of other installations with similar requirements, have a plurality of disadvantages which can be eliminated by the present invention. In the known pressure casing 20 from FIG. 1, two casing shells 20a and 20b are bolted together in a pressure-tight manner in a parting plane 21 via a flanges 23a, 23b. This is carried out by threaded bolts which, by a through-hole 27 in the upper casing shell 20a, are screwed into a threaded hole 26 in the lower casing shell 20b and, in this case, supported on the shoulder 28 in the process. Inside the bolted joint, a sealing lip 24 is arranged in the parting plane 21, and outside the bolted joint a support lip 25 is provided. On the inner side, provision can be made for a shield 22. The following disadvantages result from this arrangement:

- During the warm-up phase of the pressure casing 20, during a cold start, the casing material which surrounds the threaded bolts heats up more quickly than the shank of the threaded bolts within the through-hole 27, which, on account of the different thermal expansion of the bolts and the casing, can lead to an overload and plastic elongation of the threaded bolts with subsequent local leakages.
- At heavily loaded places, it can happen that the inner-lying sealing lip 24 is opened as a result of stresses in the casing wall, whereas the outer-lying support lip 25 is more heavily loaded because the torque created by the wall and the bolt forces has to be compensated by a higher counter-force on the support lip 25. Consequently, the necessary pressure upon the sealing lip 24 cannot be maintained any longer, in fact not even with larger bolts because with bolt diameters becoming larger the axis in which the bolt force acts is further away from the sealing lip 24 than in the case of smaller bolts, so that the leaktightness of the sealing lip 24 in actual fact is not improved.
- In order to avoid a further increase of the bolt loading and to improve the situation described above, according to FIG. 1 the bolts are arranged so that their axes in the parting plane 21 of the flanged joint (tangentially) contact the center line 20c of the casing wall. This results in the inner side of the generally axially symmetrical (partially cylindrical or conical) casing 20 being disrupted in symmetry as a result of a deviation 29, which necessitates a special costly construction, for example for the inner shield 22.

SUMMARY

One of numerous aspects of the present invention includes a (splittable) pressure casing in which the bolts of the flanged joint are exposed to a reduced thermal loading.

Another aspects is based on a pressure casing which comprises a plurality of casing shells which can be connected in a pressure-tight manner in a parting plane by a flange, wherein the casing shells are pressed together with sealing effect in the parting plane in the region of the flange by at least one threaded bolt which extends through the flange perpendicularly to the parting plane. The at least one threaded bolt is exposed over a part of its length towards the inner side of the casing.

Another aspect includes that the flange has a recess on the inner side of the casing, and the at least one threaded bolt extends through the recess.

In particular, the recess is formed in such a way that the least one threaded bolt is entirely exposed in the recess over the greatest part of its length.

Another aspect includes that the casing has a center plane, and the at least one threaded bolt lies with its axis tangential to the center plane.

Another aspect includes that a sealing lip, which seals the casing on the outside, is arranged in the parting plane between the two casing shells, and in that the at least one threaded bolt is arranged inside the sealing lip.

BRIEF DESCRIPTION OF THE DRAWINGS

The invention shall subsequently be explained in more detail based on exemplary embodiments in conjunction with the drawing. In the drawing

DETAILED DESCRIPTION OF EXEMPLARY EMBODIMENTS

Figure 1:
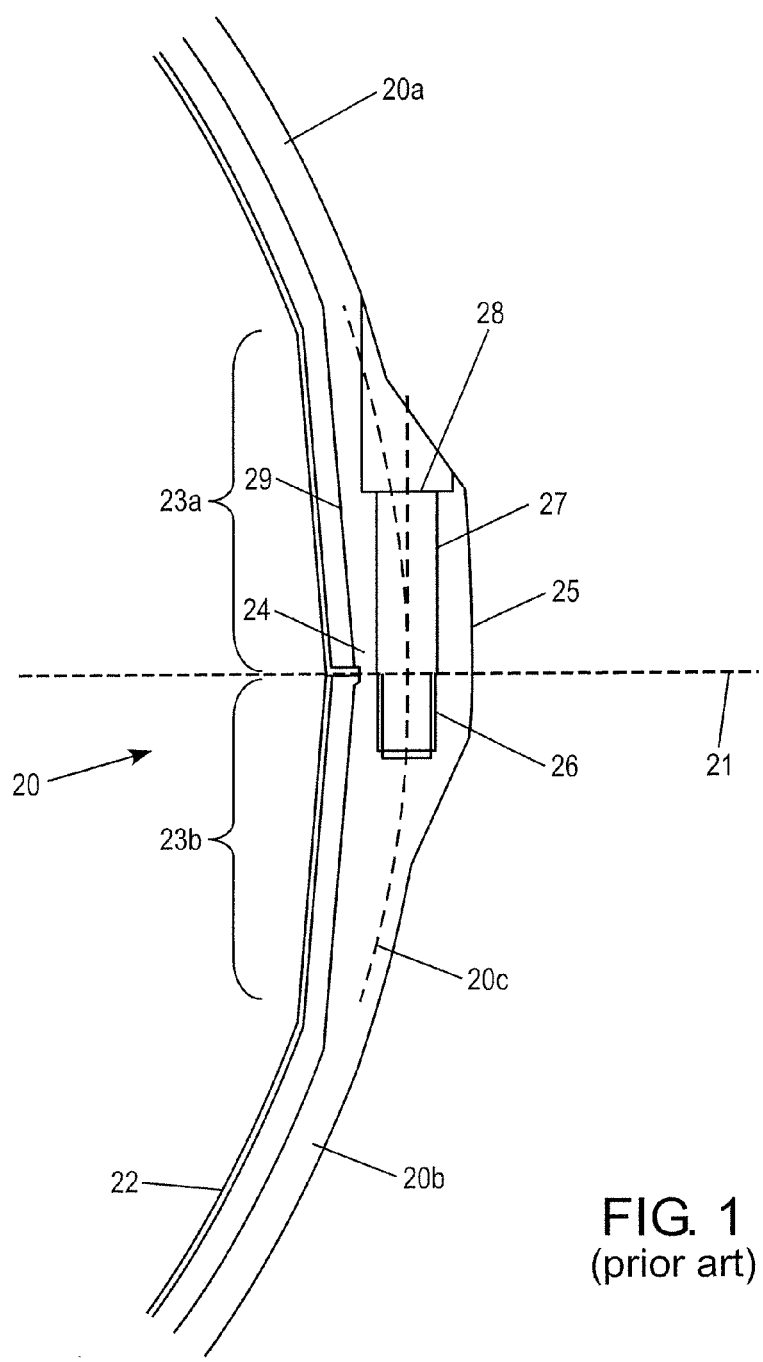
FIG. 1 shows in a sectional view a flanged joint of a pressure casing according to the prior art.
Figures 2A, 2B:
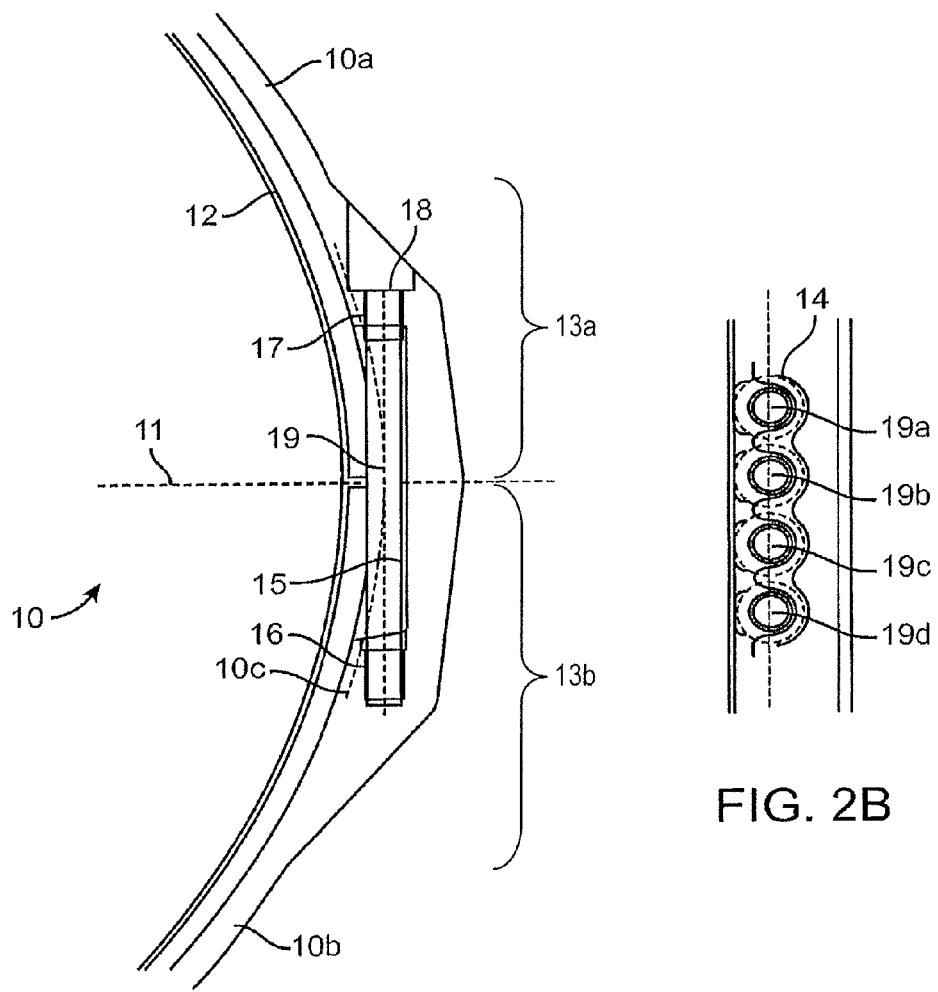
FIG. 2 shows in a sectional view perpendicularly to the parting plane (FIG. 2(a)) and in the parting plane (FIG. 2(b)) a flanged joint of a pressure casing according to a first exemplary embodiment of the invention.

The above-described disadvantages of the conventional pressure casing with a flanged joint can be eliminated by a construction as is reproduced in FIG. 2 in an exemplary embodiment of the invention. The pressure casing 10 from FIG. 2 includes an upper casing shell 10a and a lower casing shell 10b which abut on a flanges 13a, 13b in a parting plane 11 and are bolted to each other there in a pressure-tight manner. The threaded bolts 19 or 19a-d which are provided for this are not drawn in their entirety in FIG. 2, but are only outlined. For each of the threaded bolts 19, 19a-d, provision is made in the upper casing shell 10a in the region of the flange 13a for a through-hole 17 with a shoulder 18, and provision is made in the lower casing shell 10b for a threaded hole 16 which is in alignment with the through-hole. On the inner side of the casing 10, provision can again be made for a shield 12. The center line 10c through the casing wall is also drawn in.

The threaded bolt 19 is inserted in each case from the top through the through-hole 17 and then screwed into the threaded hole 16. A recess 15 is provided in the flanges 13a, 13b between the comparatively short through-hole 17 and the also comparatively short threaded hole 16 in such a way that the screwed-in threaded bolt 19 does not extend over the greatest part of its length inside the flange material but is exposed towards the interior space of the casing 10 and is therefore exposed to the temperatures in the interior space. Sealing is effected outside the threaded bolts 19 or 19a-d by a corresponding sealing lip 14, which is clear to see in its design in FIG. 2(b).

As a result of this type of construction, the following advantages according to principles of the present invention can ensue:

Because the shanks of the threaded bolts 19, 19a-d are located on the inner side of the casing 10, they heat up more quickly than the casing 10 itself. If necessary, the transient thermal behavior of the threaded bolts can be altered or finely adjusted by a defined insulation or additional heating being locally provided (e.g., by a leakage in a shield or insulation).

Since the axes of the threaded bolts 19, 19a-d are located on the inner side of the sealing face, any increase in the wall forces leads to an increase in the pressure upon the seal.

On account of the recess 15, the axial symmetry of the interior space is not disturbed, even if the bolt axis is tangential to the center line 10c in the parting plane, which is still to be recommended in order to avoid bending forces in the casing wall.

LIST OF DESIGNATIONS

| | |
|---|---|
| 10, 20 | Pressure casing |
| 10a, 20a | Upper casing shell |
| 10b, 20b | Lower casing shell |
| 10c, 20c | Center line |
| 11, 21 | Parting plane |
| 12, 22 | Shield |
| 13a, 13b, 23a, 23b | Flanges |
| 14, 24 | Sealing lip |
| 15 | Recess |
| 16, 26 | Threaded hole |
| 17, 27 | Through-hole |
| 18, 28 | Shoulder |
| 19a, 19a-d | Threaded bolt |
| 25 | Support lip |
| 29 | Deviation |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A pressure casing for a thermal machine comprising:
at least two casing shells, each shell including a flange and being configured and arranged to be connected in a pressure-tight manner in a parting plane by each flange; and
at least one threaded bolt pressing and sealing together the casing shells in the parting plane in the region of the flanges, the at least one threaded bolt extending through the flanges perpendicularly to the parting plane;
wherein the at least one threaded bolt is exposed over a majority of a length of the at least one threaded bolt towards an inner side of the pressure casing.

2. The pressure casing as claimed in claim 1, wherein:
each flange has a recess on the inner side of the pressure casing; and the at least one threaded bolt extends through each recess.

3. The pressure casing as claimed in claim 2, wherein each recess is formed so that the least one threaded bolt is exposed in each recess.

4. The pressure casing as claimed in claim 1, wherein the at least one threaded bolt has a long axis;
the pressure casing has a center line; and
the at least one threaded bolt lies with the long axis tangential to the center line.

5. The pressure casing as claimed in claim 1, further comprising:
a sealing lip, configured and arranged to seal the pressure casing on the outside, located in the parting plane between the two casing shells; and
wherein the at least one threaded bolt is positioned inside the sealing lip.

\* \* \* \* \*